United States Patent
Hirano et al.

(10) Patent No.: US 9,985,261 B2
(45) Date of Patent: May 29, 2018

(54) SEPARATOR FOR NONAQUEOUS ELECTROLYTE SECONDARY BATTERY AND NONAQUEOUS ELECTROLYTE SECONDARY BATTERY

(71) Applicant: Panasonic Corporation, Osaka (JP)

(72) Inventors: Nobuhiro Hirano, Osaka (JP); Isao Fujiwara, Osaka (JP); Masaru Watanabe, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days. days.

(21) Appl. No.: 14/935,532

(22) Filed: Nov. 9, 2015

(65) Prior Publication Data

US 2016/0156008 A1 Jun. 2, 2016

(30) Foreign Application Priority Data

Nov. 28, 2014 (JP) ................................ 2014-241635

(51) Int. Cl.
| | | |
|---|---|---|
| *H01M 2/16* | (2006.01) | |
| *H01M 2/14* | (2006.01) | |
| *H01M 10/0525* | (2010.01) | |

(52) U.S. Cl.
CPC ........... *H01M 2/1626* (2013.01); *H01M 2/14* (2013.01); *H01M 2/1653* (2013.01); *H01M 2/145* (2013.01); *H01M 10/0525* (2013.01)

(58) Field of Classification Search
CPC .... H01M 2/1626; H01M 2/1653; H01M 2/14; H01M 10/0525; H01M 2/145
See application file for complete search history.

(56) References Cited

U.S. PATENT DOCUMENTS

| | | | |
|---|---|---|---|
| 8,703,668 B2 * | 4/2014 | Melville | .................. C08J 3/215 |
| | | | 428/422 |
| 2009/0155678 A1 | 6/2009 | Less et al. | |
| 2013/0101889 A1 | 4/2013 | Mizuno et al. | |
| 2013/0130092 A1 | 5/2013 | Roth et al. | |
| 2014/0299019 A1 | 10/2014 | Wu et al. | |
| 2016/0351874 A1 * | 12/2016 | Kang | .................. H01M 2/1626 |

FOREIGN PATENT DOCUMENTS

| | | | |
|---|---|---|---|
| CN | 103026530 A | | 4/2013 |
| JP | 2008-004438 | | 1/2008 |
| JP | 2010-202987 A | | 9/2010 |
| JP | 2013-099940 | | 5/2013 |
| WO | WO 2008099173 | * | 8/2008 |
| WO | 2013/054936 | | 4/2013 |

OTHER PUBLICATIONS

Non-final Office Action issued in related U.S. Appl. No. 14/938,500, dated Apr. 5, 2017.
English Translation of Chinese Search Report dated Aug. 31, 2017 for the related Chinese Patent Application No. 201510658778.6.
U.S. Office Action issued in U.S. Appl. No. 14/938,500 dated Jan. 25, 2018, 7 pages.

* cited by examiner

*Primary Examiner* — Laura Weiner
(74) *Attorney, Agent, or Firm* — McDermott Will & Emery LLP

(57) ABSTRACT

A separator according to the present disclosure includes cellulose fibers and fluororesin particles.

8 Claims, 1 Drawing Sheet

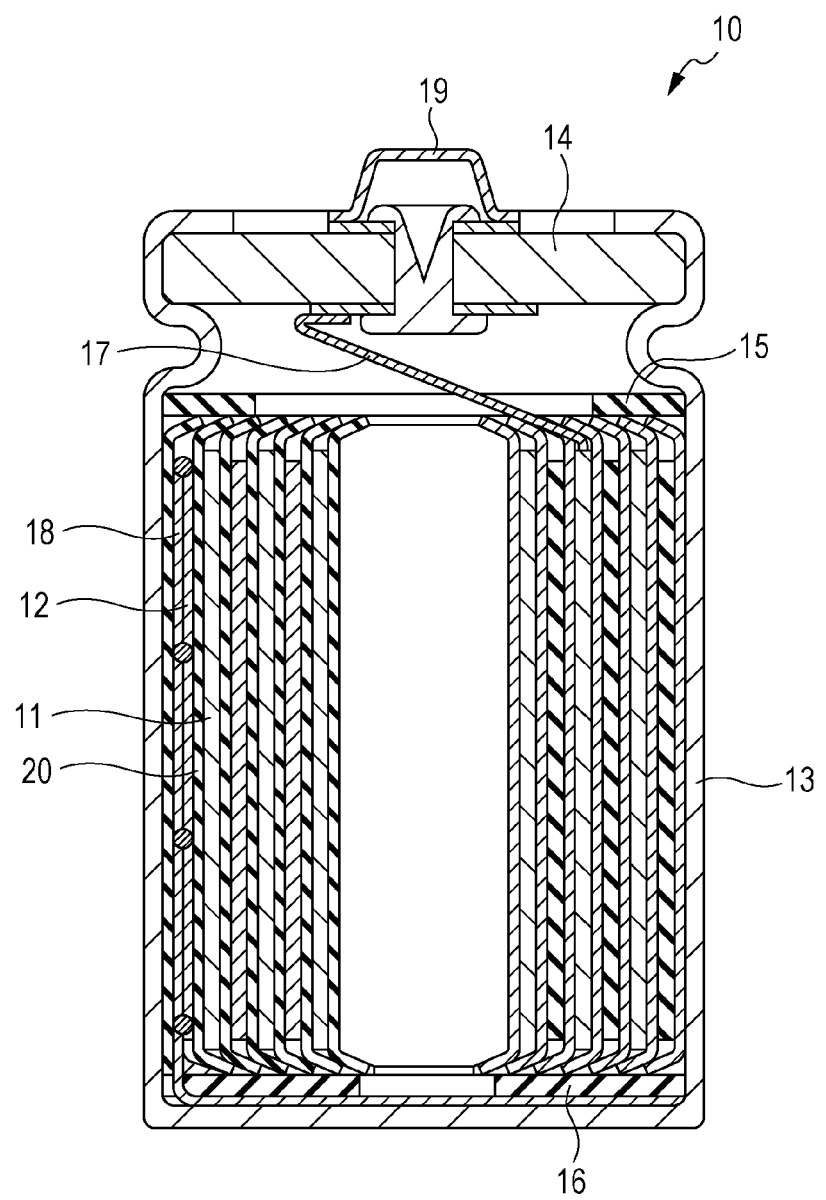

SEPARATOR FOR NONAQUEOUS ELECTROLYTE SECONDARY BATTERY AND NONAQUEOUS ELECTROLYTE SECONDARY BATTERY

BACKGROUND

1. Technical Field

The present disclosure relates to a separator for a nonaqueous electrolyte secondary battery and a nonaqueous electrolyte secondary battery.

2. Description of the Related Art

As a separator for a nonaqueous electrolyte secondary battery, a porous film made of cellulose fibers is known (for example, see Japanese Unexamined Patent Application Publication No. 2013-99940, hereinafter referred to as Patent Literature 1). As a separator including cellulose fibers for a nonaqueous electrolyte secondary battery, a porous film made of a fibrous material, such as cellulose fibers, and inorganic particles, such as alumina, is known (for example, see Japanese Unexamined Patent Application Publication No. 2008-4438, hereinafter referred to as Patent Literature 2).

However, the separator for a nonaqueous electrolyte secondary battery disclosed in Patent Literature 1 may not have satisfactory air permeability. In the separator for a nonaqueous electrolyte secondary battery disclosed in Patent Literature 2, the retention of the nonaqueous electrolyte (electrolytic solution) is low, and the cycling characteristics of the nonaqueous electrolyte secondary battery may not be satisfactory.

SUMMARY

One non-limiting and exemplary embodiment provides a separator for a nonaqueous electrolyte secondary battery having excellent retention of a nonaqueous electrolyte (electrolytic solution) while ensuring satisfactory air permeability.

In one general aspect, the techniques disclosed here feature a separator for a nonaqueous electrolyte secondary battery comprising cellulose fibers and fluororesin particles.

The present disclosure can provide a separator for a nonaqueous electrolyte secondary battery having excellent retention of a nonaqueous electrolyte (electrolytic solution) while ensuring satisfactory air permeability.

Additional benefits and advantages of the disclosed embodiments will become apparent from the specification and drawing. The benefits and/or advantages may be individually obtained by the various embodiments and features of the specification and drawing, which need not all be provided in order to obtain one or more of such benefits and/or advantages.

BRIEF DESCRIPTION OF THE DRAWING

The FIGURE is a cross-sectional view of a nonaqueous electrolyte secondary battery as an example of an embodiment of the present disclosure.

DETAILED DESCRIPTION

Underlying Knowledge Forming Basis of the Present Disclosure

A point of view of an embodiment according to the present disclosure will now be described. In the separator for a nonaqueous electrolyte secondary battery, air permeability and retention of the nonaqueous electrolyte (hereinafter, referred to as electrolytic solution) are extremely important for, for example, preventing a deterioration in the cycling characteristics in the nonaqueous electrolyte secondary battery. The present inventors have found that a separator made of cellulose fibers as in Patent Literature 1 is a dense film due to hydrogen bonds formed between the cellulose fibers and cannot thereby have satisfactory air permeability. The present inventors have also found that in a separator made of a fibrous material, such as cellulose fibers, and inorganic particles, such as alumina, as in Patent Literature 2, the presence of the inorganic particles such as alumina having low compatibility with the electrolytic solution inhibits the electrolytic solution from permeating into the separator to reduce the retention of the electrolytic solution in the separator. In addition, a separator for a nonaqueous electrolyte secondary battery not having satisfactory air permeability and having low retention of the electrolytic solution, the separator has a risk of, for example, reducing the ion conductivity and deteriorating the cycling characteristics of the nonaqueous electrolyte secondary battery. Based on these findings, the present inventors have arrived at the disclosure of each embodiment described below.

The separator for a nonaqueous electrolyte secondary battery according to a first aspect of the present disclosure includes cellulose fibers and fluororesin particles. In the first aspect, the separator is filled with the fluororesin particles. As a result, the fluororesin particles prevent formation of hydrogen bonds between cellulose fibers to appropriately broaden the distance between the cellulose fibers and provide satisfactory air permeability. That is, appropriate pores that allow permeation of the electrolytic solution into the separator and movement of the ions in the separator are formed in the separator. In addition, since the fluororesin particles have higher compatibility with the electrolytic solution than that of inorganic particles such as alumina, permeation of the electrolytic solution into the separator is enhanced, and the separator has excellent retention of the electrolytic solution. The separator thus having excellent retention of the electrolytic solution while ensuring satisfactory air permeability can, for example, prevent a reduction in the ion conductivity and prevent a deterioration in the cycling characteristics of the nonaqueous electrolyte secondary battery.

In a second aspect, for example, the cellulose fibers according to the first aspect may have an average fiber diameter of 0.05 µm or less. In the second aspect, for example, the separator can be provided with pores having uniform diameters and has more satisfactory air permeability or more excellent retention of the electrolytic solution, compared to the case of cellulose fibers having an average fiber diameter of larger than 0.05 µm.

In a third aspect, for example, the fluororesin particles according to the first aspect or the second aspect may have a ratio of the volume average particle diameter (Dv) to the number average particle diameter (Dn) of less than 2. In the third aspect, more satisfactory air permeability or more excellent retention of the electrolytic solution can be achieved, compared to the case of having a ratio of the volume average particle diameter (Dv) to the number average particle diameter (Dn) of 2 or more.

In a fourth aspect, for example, the fluororesin particles according to any one of the first to third aspects may have a volume average particle diameter within a range of 50 to 500 nm. In the fourth aspect, more satisfactory air permeability or more excellent retention of the electrolytic solution can be achieved, compared to the case of having a volume average particle diameter not satisfying the above-mentioned range.

In a fifth aspect, for example, the fluororesin particles according to any one of the first to fourth aspects may have a softening temperature of 200° C. or more. In the fifth aspect, the separator has an enhanced heat shrinkage resistance, compared to the case of having a softening temperature of less than 200° C.

In a sixth aspect, for example, the fluororesin particles according to any one of the first to fifth aspects may include polyvinylidene fluoride or a polyvinylidene fluoride-hexafluoropropylene polymer. In the sixth aspect, more excellent retention of the electrolytic solution is achieved or the heat shrinkage resistance of the separator is improved.

The nonaqueous electrolyte secondary battery according to a seventh aspect comprises, for example, a positive electrode, a negative electrode, a separator for a nonaqueous electrolyte secondary battery according to any one of the first to sixth aspects interposed between the positive electrode and the negative electrode, and a nonaqueous electrolyte. In the seventh aspect, the satisfactory air permeability of the separator is ensured, and excellent retention of the electrolytic solution is achieved. As a result, for example, the cycling characteristics of the nonaqueous electrolyte secondary battery are prevented from reducing.

Embodiments according to the present disclosure will now be described in detail with reference to the drawing. The embodiments described below are mere examples, and the present disclosure is not limited thereto. The drawing referred to in the embodiments is schematic.

The FIGURE is a cross-sectional view of a nonaqueous electrolyte secondary battery 10 as an example of an embodiment of the present disclosure.

As shown in the FIGURE, the nonaqueous electrolyte secondary battery 10 includes a positive electrode 11, a negative electrode 12, a separator 20 for a nonaqueous electrolyte secondary battery (hereinafter, simply referred to as "separator 20") interposed between the positive electrode 11 and the negative electrode 12, and a nonaqueous electrolyte (not shown). The positive electrode 11 and the negative electrode 12 are wound with the separator 20 therebetween to constitute a wound electrode group together with the separator 20. The nonaqueous electrolyte secondary battery 10 includes a cylindrical battery case 13 and a sealing plate 14. The battery case 13 accommodates the wound electrode group and the nonaqueous electrolyte. An upper insulating plate 15 and a lower insulating plate 16 are disposed on both ends in the longitudinal direction of the wound electrode group. The positive electrode 11 is connected to one end of a positive electrode lead 17. The other end of the positive electrode lead 17 is connected to a positive electrode terminal 19 disposed on the sealing plate 14. The negative electrode 12 is connected to one end of a negative electrode lead 18. The other end of the negative electrode lead 18 is connected to the bottom inside the battery case 13. The opening end of the battery case 13 is swaged to the sealing plate 14 to seal the battery case 13.

Although the FIGURE shows an example of a cylindrical battery including a wound electrode group, the application of the present disclosure is not limited to this. The battery may have any shape and may be, for example, a square battery, a flat battery, a coin battery, or a laminate film pack battery.

The positive electrode 11 contains, for example, a positive electrode active material such as a lithium-containing complex oxide. The lithium-containing complex oxide is not particularly limited, and examples thereof include lithium cobaltate, modified products of lithium cobaltate, lithium nickelate, modified products of lithium nickelate, lithium manganate, and modified products of lithium manganate. A modified product of lithium cobaltate contains, for example, nickel, aluminum, or magnesium. A modified product of lithium nickelate contains, for example, cobalt or manganese.

The positive electrode 11 necessarily contains a positive electrode active material and optionally contains a binder and an electroconductive material. Examples of the binder include polyvinylidene fluoride (PVDF), modified products of PVDF, polytetrafluoroethylene (PTFE), and modified acrylonitrile rubber particles. The PTFE and rubber particles are preferably used in combination with a compound having a thickening effect, such as carboxymethyl cellulose (CMC), polyethylene oxide (PEO), or soluble modified acrylonitrile rubber. Examples of the electroconductive material include acetylene black, Ketjen black, and various types of graphite.

The negative electrode 12 contains, for example, a carbon material such as graphite or a negative electrode active material such as a silicon-containing material or a tin-containing material. Examples of the graphite include natural graphite and artificial graphite. In addition, metallic lithium or a lithium alloy containing tin, aluminum, zinc, magnesium, or the like can be used.

The negative electrode 12 necessarily contains a negative electrode active material and optionally contains a binder and an electroconductive material. Examples of the binder include PVDF, modified products of PDF, styrene-butadiene copolymers (SBRs), and modified products of SBRs. Among these binders, from the viewpoint of chemical stability, SBRs and modified products thereof are particularly preferred. The SBRs and modified products thereof are preferably used in combination with CMC having a thickening effect.

The nonaqueous electrolyte is not particularly limited and a nonaqueous solvent dissolving a lithium salt can be suitably used. Examples of the lithium salt include $LiPF_6$ and $LiBF_4$. Examples of the nonaqueous solvent include ethylene carbonate (EC), propylene carbonate (PC), dimethyl carbonate (DMC), diethyl carbonate (DEC), and ethyl methyl carbonate (EMC). These solvents are preferably used in combination.

The separator 20 is interposed between the positive electrode 11 and the negative electrode 12 and prevents a short circuit from occurring between the positive electrode 11 and the negative electrode 12 while allowing Li ions to permeate therethrough. The separator 20 is a porous film having a large number of pores functioning as paths through which Li ions pass during charging and discharging of the nonaqueous electrolyte secondary battery 10.

The separator 20 is a porous film containing cellulose fibers and fluororesin particles. The separator 20 may contain other organic fibers, in addition to the cellulose fibers. Examples of the organic fibers other than the cellulose fibers include thermoplastic resin fibers. The separator 20 may further contain other components, such as a sizing agent, wax, an inorganic filler, an organic filler, a colorant, a stabilizer (such as antioxidant, heat stabilizer, or UV absorber), a plasticizer, an antistatic agent, and a flame retardant.

Cellulose Fibers

Examples of the cellulose fibers include natural cellulose fibers, such as coniferous wood pulp, broad-leaved wood pulp, esparto pulp, manila hemp pulp, sisal hemp pulp, and cotton pulp; and regenerated cellulose fibers obtained by organic solvent spinning of these natural cellulose fibers, such as lyocell.

The cellulose fibers are preferably fibrillated cellulose fibers from the viewpoint of, for example, control of the pore diameter, retention of nonaqueous electrolyte, and battery life. The term "fibrillation" refers to a phenomenon of, for example, loosening fibers consisting of multiple bundles of fibrils by, for example, rubbing action into the fibrils to fluff the surfaces of the fibers. Fibrillation can be achieved by beating fibers with a beating machine, such as a beater, refiner, or mill, or by fibrillating fibers with a bead mill, extruding kneader, or shearing force under high pressure.

The content of the cellulose fibers is preferably 50% by mass or more, more preferably in a range of 60% to 90% by mass, based on the total amount of the separator 20 from the viewpoint of, for example, mechanical strength of the separator 20.

The cellulose fibers preferably have an average fiber diameter of 0.05 µm or less and more preferably in a range of 0.02 to 0.03 µm. The cellulose fibers having an average fiber diameter of 0.05 µm or less allows, for example, the separator to have pores having uniform diameters and more satisfactory air permeability or more excellent retention of the electrolytic solution, compared to those not satisfying the above-mentioned range. In addition, the use of two types of cellulose fibers having different average fiber diameters is also preferred. A preferred example thereof is the use of cellulose fibers A having an average fiber diameter of 0.02 µm or less and an average fiber length of 50 µm or less and cellulose fibers B having an average fiber diameter of 0.7 µm or less and an average fiber length of 50 µm or less.

Fluororesin Particles

Examples of the fluororesin of the fluororesin particles include polyvinylidene fluoride (hereinafter may be referred to as "PVDF"), copolymers of vinylidene fluoride (hereinafter may be referred to as "VDF") and an olefinic monomer, polytetrafluoroethylene (PTFE), tetrafluoroethylene-perfluoro(alkyl vinyl ether) copolymers (PFA), and tetrafluoroethylene-hexafluoropropylene copolymers (FEP). Examples of the olefinic monomer include tetrafluoroethylene, hexafluoropropylene (hereinafter referred to as "HFP"), and ethylene. Among these fluororesins, polyvinylidene fluoride and vinylidene fluoride-hexafluoropropylene polymers (copolymers of VDF and HFP) are preferred because of, for example, their low crystalline properties to improve the retention of the electrolytic solution or their high softening temperatures (200° C. or more) to improve the heat resistance.

The fluororesin particles preferably have a softening temperature of 200° C. or more, from the viewpoint of improving the heat shrinkage resistance of the separator 20. Examples of the fluororesin particles having a softening temperature of 200° C. or more include polyvinylidene fluoride and vinylidene fluoride-hexafluoropropylene polymers. The softening temperature is measured by thermomechanical analysis (TMA) described in JIS-K7196-1991.

The fluororesin particles preferably have a ratio of the volume average particle diameter (Dv) to the number average particle diameter (Dn) of less than 2, more preferably within a range of 1 to 1.5. When the value of volume average particle diameter (Dv)/number average particle diameter (Dn) of the fluororesin particles is less than 2, the fluororesin particles have a uniform particle size distribution, compared to the case of which the ratio is higher than 2, and such fluororesin particles are dispersed in the separator 20. Consequently, for example, pores having uniform diameters are readily formed in the separator 20 to provide satisfactory air permeability or excellent retention of the electrolytic solution to the separator 20. The volume average particle diameter (Dv) and the number average particle diameter (Dn) can be measured with a laser diffraction particle size distribution analyzer (for example, LA-750, manufactured by Horiba, Ltd.) or a light scattering particle size distribution analyzer (for example, ELS-8000, manufactured by Otsuka Electronics Co., Ltd.).

The fluororesin particles preferably have a volume average particle diameter (Dv) within a range of 0.05 to 0.5 µm, more preferably 0.1 to 0.3 µm. A volume average particle diameter (Dv) of the fluororesin particles of less than 0.05 µm is difficult to sufficiently broaden the distance between the cellulose fibers and may not provide satisfactory air permeability, compared to the case of satisfying the above-mentioned range. A volume average particle diameter (Dv) of the fluororesin particles of higher than 0.5 µm results in a too large distance between the cellulose fibers and may not provide satisfactory air permeability or may reduce the mechanical strength, compared to the case of satisfying the above-mentioned range.

The content of the fluororesin particles is not particularly limited, and is preferably in a range of 10% to 40% by mass, more preferably 10% to 20% by mass, based on the total amount of the separator 20. If the content of the fluororesin particles is less than 10% by mass, the permeability of the electrolytic solution into the separator 20 may decrease to reduce the retention of the electrolytic solution, compared to the case of satisfying the above-mentioned range. If the content of the fluororesin particles is higher than 40% by mass, the distance between the cellulose fibers may be excessively broadened to reduce the mechanical strength of the separator 20, compared to the case of satisfying the above-mentioned range.

Method of Preparing Fluororesin Particles

The fluororesin particles can be prepared by, for example, adding a fluororesin monomer and a polymerization initiator, such as ammonium persulfate (APS) to an aqueous solvent and stirring the mixture at a prescribed temperature. The fluororesin particles are prepared as an emulsion in which the particles are dispersed in the aqueous solvent.

Other Components

The separator 20, as described above, may contain another component, in addition to the cellulose fibers and the fluororesin particles. The component desirably has a softening temperature lower than that of the fluororesin particles, from the viewpoint of the shutdown function. Examples of the component having a softening temperature lower than that of the fluororesin particles include thermoplastic resins such as polypropylene and polyethylene. The operating principle of the shutdown function is that a material constituting the separator 20 melts to occlude the pores of the separator 20, and the term "shutdown function" refers to a function of significantly increasing the resistance by an increase of the battery temperature to a certain level. This shutdown function can cut off the current by the separator 20 when the batter generates heat due to any cause to prevent further generation of heat by the battery.

The air permeability of the separator 20 is, for example, preferably within a range of 5 to 50 sec/100 cc and more preferably 5 to 20 sec/100 cc. In the separator 20, as described above, since the distance between the cellulose fibers are appropriately broadened by the fluororesin particles, the above-described satisfactory air permeability can be ensured. The air permeability of the separator 20 can be adjusted by the content and the particle diameter of the fluororesin particles and the fiber diameter of the cellulose fibers for example. The air permeability of a porous film can be determined by measuring the time necessary for 100 cc of air applied with a certain pressure to pass through the porous film in the vertical direction.

When the time indicating the air permeability of the separator 20 is longer than 50 sec/100 cc, for example, since the separator 20 has pores with a smaller pore diameter compared to the case of satisfying the above-mentioned range, the permeation of the electrolytic solution into the separator 20 may be decreased to deteriorate, for example, the cycling characteristics. In contrast, when the time indicating the air permeability of the separator 20 is shorter than 5 sec/100 cc, since the separator 20 has pores with a larger pore diameter compared to the case of satisfying the above-mentioned range, an internal short circuit by lithium dendrites may easily occur. The internal short circuit by lithium dendrites occurs due to that the lithium dendrites generated on the surface of the negative electrode 12 pass through the separator 20 and reaches the positive electrode 11, for example, when charging and discharging of the battery is repeated or when the battery is overcharged.

The separator 20 may have any porosity and preferably has a porosity of 30% to 70% from the viewpoint of charge and discharge performance. The porosity is the percentage of the total pore volume of the separator 20 to the volume of the separator 20.

The areal weight of the separator 20 is preferably in a range of 5 to 20 g/m$^2$, more preferably 10 to 15 g/m$^2$, from the viewpoint of preventing an internal short circuit by lithium dendrites. When the areal weight is within a range of 5 to 20 g/m$^2$, the separator 20 can ensure a sufficient thickness while maintaining satisfactory air permeability, compared to the case of having an areal weight outside the above-mentioned range. Consequently, higher performance of preventing an internal short circuit can be achieved.

The maximum pore diameter of the separator 20 is preferably 0.4 µm or less, and, more preferably, in the pore size distribution of the separator 20, the volume of pores having a pore diameter of 0.05 µm or less is 50% or more of the total pore volume. A maximum pore diameter of the separator 20 of higher than 0.4 µm may reduce the mechanical strength, the density of pores, and other factors of the separator 20 to readily cause an internal short circuit by lithium dendrites, compared to the case of having a maximum pore diameter of 0.4 µm or less. When the volume of pores having a pore diameter larger than 0.05 µm is higher than 50% of the total pore volume (the volume of pores having a pore diameter of 0.05 µm or less is less than 50% of the total pore volume) in the pore size distribution of the separator 20, the mechanical strength, the density of pores, and other factors of the separator 20 are reduced to readily cause an internal short circuit by lithium dendrites, compared to the case of a separator in which the volume of pores having a pore diameter of 0.05 µm or less is 50% or more of the total pore volume.

The pore size distribution of the separator 20 is measured, for example, with a perm porometer that can measure pore diameters in accordance with a bubble point method (JIS K3832, ASTM F316-86). As the perm porometer, for example, model CFP-1500AE manufactured by Seika Corporation can be used. This perm porometer can measure pores having a pore size down to 0.01 µm by using a solvent having a low surface tension, SILWICK (20 dyne/cm) or GAKWICK (16 dyne/cm), as a test solution and pressurizing the dry air up to a measuring pressure of 3.5 MPa. The pore size distribution can be determined from the amount of air passed through at the measuring pressure.

Here, the maximum pore diameter of the separator 20 is the maximum pore diameter in the peaks observed in the pore size distribution measured as described above. The percentage (%) of the volume of pores having a pore diameter of 0.05 µm or less to the total pore volume can be determined by determining the ratio (B/A) of the peak area (B) corresponding to the pores having a pore diameter of 0.05 µm or less to the total peak area (A) in the pore size distribution.

The pore size distribution of the separator 20 measured with a perm porometer preferably widely ranges from 0.01 µm to 0.2 µm, and the distribution preferably has at least one peak within a pore diameter range of 0.01 to 0.2 µm.

The separator 20 preferably has a thickness of 5 to 30 µm from the viewpoint of ensuring the mechanical strength and other factors and also improving the charge and discharge performance of the nonaqueous electrolyte secondary battery 10. A thickness of the separator 20 of 5 µm or more increases the mechanical strength and further prevents the occurrence of an internal short circuit by lithium dendrites, compared to the case having a thickness less than 5 µm. A thickness of the separator 20 of 30 µm or less prevents the charge and discharge performance from deteriorating, compared the case of having a thickness larger than 30 µm.

Method of Producing Separator 20

The separator 20 can be produced by, for example, applying an aqueous dispersion onto one surface of a substrate and drying the dispersion, where the dispersion is prepared by dispersing, for example, an emulsion containing cellulose fibers and fluororesin particles in an aqueous solvent and the substrate can be peeled later. Examples of the aqueous solvent include solvents containing surfactants, thickening agents, and other additives and having adjusted viscosities and dispersion states. From the viewpoint of forming pores in the separator, the aqueous dispersion may contain an organic solvent. The organic solvent has high compatibility with water, and examples thereof include glycols, such as ethylene glycol; glycol ethers; glycol diethers; and polar solvents, such as N-methyl-pyrrolidone. In addition, the use of an aqueous binder solution, such as CMC or PVA, or a binder emulsion, such as SBR, can adjust the viscosity of the slurry and enhance the mechanical strength of the separator 20. The separator 20 can be a porous film prepared by mixing, with the slurry, long fibers of a resin in an amount that does not affect the coating properties of the slurry and welding the resin fibers by thermal calendering press.

EXAMPLES

The present disclosure will now be described by Examples, but is not limited to the following Examples.

Example 1

Production of Emulsion Containing Fluororesin Particles

Deionized water (190 parts by mass) was charged in an autoclave purged with nitrogen and provided with a dropping device and a stirrer and was heated to 70° C. with stirring. An aqueous solution prepared by dissolving an aqueous ammonium persulfate solution (0.5 parts by mass) in deionized water (10 parts by mass) was then added to the deionized water. To this mixture was dropwise added vinylidene fluoride (30 parts by mass) by pressure sealing with nitrogen pressurized to 0.7 MPa over 4 hours with stirring while maintaining the temperature at 70° C. The stirring was further continued for 3 hours while maintaining the temperature to perform polymerization. This procedure gave emulsion A-1 containing polyvinylidene fluoride resin particles.

Preparation of Cellulose Fiber Slurry

Cellulose fibers (3 parts by mass as the solid content) having a fiber diameter of 0.5 μm or less (average fiber diameter: 0.02 μm) and a fiber length of 50 μm or less and emulsion A-1 (0.6 parts by mass as the solid content) were dispersed in water (100 parts by mass), and an ethylene glycol solution (1 part by mass) was added thereto to prepare a cellulose fiber slurry.

Production of Separator

The cellulose fiber slurry was applied onto one surface of a peelable substrate at an areal weight of 12 g/m², and the applied slurry was dried to produce a film containing cellulose fibers and polyvinylidene fluoride resin particles on the surface of the substrate. This film was compressed with a calender roll at 140° C. and was then peeled from the substrate to give a separator having a thickness of 15 μm.

Example 2

A separator was produced as in Example 1 except that emulsion A-2 containing vinylidene fluoride-hexafluoropropylene polymer particles was prepared using 28 parts by mass of vinylidene fluoride and 0.6 parts by mass of the aqueous ammonium persulfate solution in the preparation of the emulsion containing fluororesin particles and was used.

Example 3

A separator was produced as in Example 1 except that emulsion A-3 containing vinylidene fluoride-hexafluoropropylene polymer particles was prepared using 27 parts by mass of vinylidene fluoride, 0.6 parts by mass of the aqueous ammonium persulfate solution, and also 3 parts by mass of hexafluoropropylene in the preparation of the emulsion containing fluororesin particles and was used.

Example 4

A separator was produced as in Example 1 except that emulsion A-4 containing vinylidene fluoride-hexafluoropropylene polymer particles was prepared using 26 parts by mass of vinylidene fluoride, 0.6 parts by mass of the aqueous ammonium persulfate solution, and also 4 parts by mass of hexafluoropropylene in the preparation of the emulsion containing fluororesin particles and was used.

Example 5

A separator was produced as in Example 1 except that emulsion A-3 containing vinylidene fluoride-hexafluoropropylene polymer particles was prepared using 24 parts by mass of vinylidene fluoride, 0.6 parts by mass of the aqueous ammonium persulfate solution, and also 6 parts by mass of hexafluoropropylene in the preparation of the emulsion containing fluororesin particles and was used.

Comparative Example

A separator was produced as in Example 1 except that the emulsion containing fluororesin particles was not used.

Table 1 shows the compositions and physical properties of the emulsions (A-1 to A-5) containing fluororesin particles used in Examples 1 to 5. Table 2 shows the compositions of the cellulose fiber slurries used in Examples 1 to 5 and Comparative Example and the physical properties of the separators of Examples 1 to 5 and Comparative Example. The increased amounts of liquid shown in Table 1 were evaluated as follows.

Evaluation of Increased Amount of Liquid

A film having thickness of 100 μm was prepared from each of the emulsions containing fluororesin particles used in Examples 1 to 5. The films were impregnated with a polyethylene carbonate solution (PC solution) in an environment of room temperature or 60° C. for 24 hours. The difference between the film weight before the impregnation with the PC solution and the film weight after the impregnation with the PC solution was determined, and the increased amounts (%) of the PC solution at room temperature and at 60° C. were calculated. A higher value of the increased amount of the PC solution means higher retention of the electrolytic solution.

TABLE 1

|  |  | Emulsion containing fluororesin particles | | | | |
|---|---|---|---|---|---|---|
|  |  | A-1 | A-2 | A-3 | A-4 | A-5 |
| Composition ratio (parts by mass) | VDF (vinylidene fluoride) | 30 | 28 | 27 | 26 | 24 |
|  | HFP (hexafluoropropylene) | 0 | 2 | 3 | 4 | 6 |
|  | APS (polymerization initiator) | 0.5 | 0.6 | 0.6 | 0.6 | 0.6 |
| Melting point | ° C. | 165 | 156 | 152 | 147 | 135 |
| Volume average particle diameter | μm | 120 | 120 | 120 | 120 | 120 |
| Increased amount of liquid (room temperature) | % | 20 | 30 | 40 | 50 | 80 |
| Increased amount of liquid (60° C.) | % | 35 | 50 | 70 | 150 | 220 |

TABLE 2

|  | Cellulose fiber slurry | Example 1 | Example 2 | Example 3 | Example 4 | Example 5 | Comparative Example |
|---|---|---|---|---|---|---|---|
| Composition ratio (parts by mass) | Water | 100 | 100 | 100 | 100 | 100 | 100 |
|  | Cellulose fiber (fiber diameter: 0.5 μm or less) | 3 | 3 | 3 | 3 | 3 | 3 |
|  | Emulsion A-1 | 0.6 |  |  |  |  |  |

TABLE 2-continued

| Cellulose fiber slurry | | Example 1 | Example 2 | Example 3 | Example 4 | Example 5 | Comparative Example |
|---|---|---|---|---|---|---|---|
| Emulsion A-2 | | | 0.6 | | | | |
| Emulsion A-3 | | | | 0.6 | | | |
| Emulsion A-4 | | | | | 0.6 | | |
| Emulsion A-5 | | | | | | 0.6 | |
| Ethylene glycol | | 1 | 1 | 1 | 1 | 1 | 1 |
| Results of evaluation of separator | | | | | | | |
| Areal weight | g/m² | 12 | 12 | 12 | 12 | 12 | 12 |
| Air permeability | s/100 cc | 8 | 7 | 10 | 15 | 20 | 800 |
| Tensile strength | N/mm | 120 | 130 | 170 | 180 | 120 | 100 |
| Piercing strength | N/φφ1 | 3.2 | 3.5 | 3.8 | 3.9 | 3.2 | 2.5 |
| Bubble point | μm | 400 | 300 | 300 | 300 | 800 | 200 |
| Average pore diameter | μm | 80 | 70 | 60 | 60 | 100 | 20 |
| Heat-resistant shrinkage rate (130° C.) | % | 0.2 | 0.3 | 0.2 | 0.2 | 2 | 0.2 |

The physical properties of the separators of Examples 1 to 5 and Comparative Example were evaluated as follows.

Evaluation of Air Permeability

Air permeability (air resistance) was evaluated in accordance with JIS P 8117 (Paper and board—Determination of air permeance and air resistance (medium range)—Part 5: Gurley method). The air permeability was the time (sec) necessary for permeation of 100 cc of air.

Evaluation of Tensile Strength

Tensile strength (20 mm/min) was evaluated in accordance with JIS K 7127 (Plastics—Determination of tensile properties—Part 3: Test conditions for films and sheets) using a test piece of 15 mm width and 150 mm length.

Evaluation of Piercing Strength

Piercing strength (5 mm/min) was evaluated in accordance with JIS K 7181 (Plastics—Determination of compressive properties) using a test piece having a length of 15 mm or more and a piercing needle having a diameter of 1 mm.

Evaluation of Bubble Point

Bubble point was evaluated with a perm porometer. The results of the evaluation of the bubble point denote the maximum pore diameter of the separator.

Evaluation of Average Pore Diameter

The average pore diameter was evaluated with a perm porometer.

Evaluation of Heat-Resistant Shrinkage Rate

A separator piece of 50 mm square cut out in the MD (the direction parallel to the winding direction) or TD (the direction perpendicular to the winding direction) was put in liquid paraffin heated to 140° C. in advance and was retained therein for 1 hour. The separator piece was then taken out, and the shrinkage rate thereof was determined by the following calculation expression:

Shrinkage rate (%)=(the length in the MD or TD after the heat treatment/50 mm)×100.

The separators containing cellulose fibers and fluororesin particles of Examples 1 to 5 all had satisfactory permeability, 20 s/100 cc or less, compared to that of the separator of Comparative Example. That is, it can be said that the separator of Example is provided with appropriate pores that allow the electrolytic solution to readily permeate into the separator and allow ions to readily pass therethrough. In addition, since the fluororesin particles in the separator improved the compatibility of the separator with the electrolytic solution, the separators of Examples all had excellent retention of the electrolytic solution. The results of increased amounts of liquid shown in Table 1 demonstrate that a film containing a polyvinylidene fluoride-hexafluoropropylene polymer had improved retention of the electrolytic solution, compared to a film containing polyvinylidene fluoride. That is, it can be said that the separators containing polyvinylidene fluoride-hexafluoropropylene polymer particles of Examples 2 to 5 have more excellent retention of the electrolytic solution, compared to the separator containing polyvinylidene fluoride resin particles of Example 1. In contrast, the separator not containing fluororesin particles of Comparative Example had very high air permeability, 800 s/100 cc. That is, it can be said that the separator of Comparative Example is hardly provided with appropriate pores. In addition, since the separator of Comparative Example does not contain fluororesin particles, the retention of the electrolytic solution was low compared to those of the separators of Examples 1 to 5. The tensile strength and the piercing strength of the separator of Comparative Example were also low compared to those of the separators of Examples 1 to 5.

In the separator of Example 5, in which the content of the hexafluoropropylene unit was the highest among Examples 1 to 5, the melting point of the fluororesin particles (polyvinylidene fluoride-hexafluoropropylene polymer particles) was decreased to 140° C. or less to reduce the heat shrinkage resistance of the separator. That is, the results of Examples 1 to 5 demonstrate that a separator having excellent heat resistance can be obtained by controlling the content of the hexafluoropropylene unit to less than 6 parts by mass based on the total amount of the fluororesin particles.

What is claimed is:

1. A separator for a nonaqueous electrolyte secondary battery comprising:
    cellulose fibers; and
    fluororesin particles,
    wherein the cellulose fibers have an average fiber diameter in a range of 0.02 μm to 0.05 μm.

2. The separator for a nonaqueous electrolyte secondary battery according to claim 1, wherein the fluororesin particles have a ratio of a volume average particle diameter (Dv) to a number average particle diameter (Dn) in a range of 1 to 2.

3. The separator for a nonaqueous electrolyte secondary battery according to claim 1, wherein the fluororesin particles have a volume average particle diameter within a range of 0.05 to 0.5 μm.

4. The separator for a nonaqueous electrolyte secondary battery according to claim 1, wherein fluororesin having a softening temperature of 200° C. or more are used as the fluororesin particles.

5. The separator for a nonaqueous electrolyte secondary battery according to claim 1, wherein the fluororesin particles include polyvinylidene fluoride or a polyvinylidene fluoride-hexafluoropropylene polymer.

6. The separator for a nonaqueous electrolyte secondary battery according to claim 1, wherein the cellulose fibers have an average fiber diameter of in a range of 0.02 μm to 0.03 μm.

7. The separator for a nonaqueous electrolyte secondary battery according to claim 1, wherein the fluororesin particles have a ratio of a volume average particle diameter (Dv) to a number average particle diameter (Dn) in a range of 1 to 1.5.

8. A nonaqueous electrolyte secondary battery comprising:
   a positive electrode;
   a negative electrode;
   a separator for a nonaqueous electrolyte secondary battery containing cellulose fibers and fluororesin particles interposed between the positive electrode and the negative electrode; and
   a nonaqueous electrolyte,
   wherein the cellulose fibers have an average fiber diameter in a range of 0.02 μm to 0.05 μm.

* * * * *